United States Patent
Chen et al.

(10) Patent No.: US 10,425,358 B2
(45) Date of Patent: Sep. 24, 2019

(54) NETWORK SWITCH ARCHITECTURE SUPPORTING MULTIPLE SIMULTANEOUS COLLECTIVE OPERATIONS

(71) Applicant: International Business Machines Corporation, Armonk, NY (US)

(72) Inventors: Dong Chen, Scardale, NY (US); Philip Heidelberger, Cortlandt Manor, NY (US); Craig Stunkel, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 15/279,805

(22) Filed: Sep. 29, 2016

(65) Prior Publication Data
US 2018/0091442 A1    Mar. 29, 2018

(51) Int. Cl.
*H04L 12/933*  (2013.01)
*H04L 12/935*  (2013.01)

(52) U.S. Cl.
CPC ............ *H04L 49/101* (2013.01); *H04L 49/30* (2013.01)

(58) Field of Classification Search
CPC ..... H04L 49/101; H04L 49/30; H04L 49/254; H04L 49/205; H04L 49/3045;
(Continued)

(56) References Cited

U.S. PATENT DOCUMENTS 6,111,880 A    8/2000 Rusu et al.
6,813,266 B1   2/2004 Chiang et al.
(Continued)

FOREIGN PATENT DOCUMENTS

DE    112013000398 T5   11/2012
EP        0996256 A2    4/2000
EP       1326473 81     9/2006

OTHER PUBLICATIONS

Bertozzi et al., Xpipes: A Network-on-Chip Architecture for Gigascale Systems-on-Chip, IEEE Circuits and Systems Magazine, Second Quarter 2004, (pp. 18-31.).

(Continued)

*Primary Examiner* — Un C Cho
*Assistant Examiner* — Rasha K Fayed
(74) *Attorney, Agent, or Firm* — Harrington & Smith

(57) ABSTRACT

An apparatus includes a collective switch hardware architecture, including an input arrangement circuit including multiple input ports and multiple outputs. The input arrangement circuit routes its multiple input ports to selected ones of its outputs. The collective switch hardware architecture includes collective reduction logic coupled to the multiple outputs of the input arrangement circuit and having multiple outputs. The collective reduction logic includes ALU(s) and arbitration and control circuitry. The ALU(s) and arbitration and control circuitry support multiple simultaneous collective operations from different collective classes, and support arbitrary input port and output port mapping to different collective classes. The collective switch hardware architecture further includes an output arrangement circuit including a multiple inputs coupled to the multiple outputs of the collective reduction logic and including multiple output ports. The output arrangement circuit is configured to route its multiple inputs to selected ones of its output ports.

24 Claims, 10 Drawing Sheets

(58) Field of Classification Search
CPC ..... H04L 49/508; H04L 49/103; H04L 49/15; H04L 49/45; H04L 49/108; H04L 49/351; H04L 49/352; H04L 49/70; H04L 49/257; H04L 49/356; H04L 49/35; H04L 49/40; H04L 12/933; H04L 12/935; H04L 12/4641; H04L 12/56; H04L 12/5601; H04L 12/28; H04L 12/50; H04L 12/24; H04L 67/10; H04L 1/1845; H04L 2012/5624; H04L 2012/5681; H04L 2012/5679; H04L 2012/568; H04L 2012/5652; H04L 41/0806; H04L 41/0846; H04L 63/101; H04L 45/72; G06F 9/30145; G06F 9/30021; G06F 9/3001; G06F 9/30018; G06F 9/30; G06F 11/348; G06F 11/3409; G06F 11/3024; G06F 15/17381; G06F 15/17393; G06F 15/17362; G06F 15/80; G06F 15/00; G06F 2201/88
USPC ....... 370/401, 412, 357, 351, 354, 389, 390, 370/392, 399, 395.5, 422, 423, 413, 429, 370/428, 395, 466, 469, 359, 360; 709/204; 708/233
See application file for complete search history.

(56) References Cited

U.S. PATENT DOCUMENTS

| | | | |
|---|---|---|---|
| 7,650,434 B2 * | 1/2010 | Blumrich | G06F 15/17337 709/250 |
| 7,680,097 B1 | 3/2010 | Goldstein et al. | |
| 8,122,228 B2 * | 2/2012 | Faraj | G06F 9/5066 709/201 |
| 9,459,757 B1 * | 10/2016 | Barsness | G06F 16/24568 |
| 2002/0176431 A1 * | 11/2002 | Golla | H04L 49/254 370/412 |
| 2004/0078493 A1 * | 4/2004 | Blumrich | G06F 15/17337 709/250 |
| 2008/0104367 A1 | 5/2008 | Blumrich et al. | |
| 2009/0009216 A1 * | 1/2009 | Lepape | G06F 15/7867 326/41 |
| 2009/0240915 A1 * | 9/2009 | Faraj | G06F 9/5066 712/28 |
| 2012/0250679 A1 * | 10/2012 | Judge | H04L 49/351 370/359 |
| 2014/0237045 A1 | 8/2014 | Chen et al. | |
| 2014/0245324 A1 * | 8/2014 | Minkenberg | G06F 9/546 719/313 |
| 2016/0087848 A1 * | 3/2016 | Heinz | H04L 45/08 370/256 |

OTHER PUBLICATIONS

Peter Newman, "A Fast Packet Switch for the Integrated Services Backbone Network", IEEE Journal on Selected Areas in Communications, 6(9), Dec. 1988, pp. 1468-1479.

Tanase, et al., "Composable, non-Blocking Collective Operations on Power7 IH", Proceedings of the 26th ACM international conference on Supercomputing, (2012), pp. 215-224.

* cited by examiner

| | FIG. 8A |
|FIG. 8| FIG. 8B |

NETWORK SWITCH ARCHITECTURE SUPPORTING MULTIPLE SIMULTANEOUS COLLECTIVE OPERATIONS

BACKGROUND

This invention relates generally to networks and, more specifically, relates to switch architectures for networks.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Collective Communication involves more than one process participating in one communication operation in a network of compute nodes. Collective communication operations aim at reducing both latency and network traffic with respect to the case where the same operations are implemented with a sequence of unicast messages. The significance of collective communication operations for scalable parallel systems has been emphasized by their inclusion in widely used parallel programming models, such as the Message Passing Interface (MPI).

As such, collective reduction and broadcast operations are commonly used in High Performance Computing (HPC) applications. An example is the MPI_Allreduce( ) function supported in the MPI library. For this function, in a cluster of compute nodes, each node contributes one or more numbers, and the result of MPI_Allreduce( ) is one sum or a vector of sums of all corresponding numbers from each node. The final result is then broadcast to all participating nodes.

Collective operations are typically separated as short or long. Typically, short can be a single double precision number per node, or 8 bytes, and long can be at least a network packet size, >=256 bytes, as examples. Exact definitions for these terms depend on implementation. In short collective operations (where collective operations are often called "collectives"), each node contributes only a few numbers, and the latency of the operation is very important. In long collectives, where each node supplies a long vector of numbers, the overall collective reduction bandwidth is an important measure. For floating point reductions, the order of operations matter. A fixed order of operations can generate reproducible results, but orders that are not fixed may not.

Direct hardware support for collectives in the network can reduce collective reduction latency for short collectives and improve bandwidth for long vectors. The IBM BLUE GENE family of supercomputers supports one collective reduction operation (short or long) at a time per node in the embedded network logic, with reproducible floating point results. The IBM POWER 7IH (P71H) torrent network (the IBM torrent chip is a network hub chip used in the P71H machine, which is a high performance computer) supports multiple short collectives in hardware, but may not guarantee reproducibility for floating point operations. The associated project for the P71H is PERCS (Productive, Easy-to-use, Reliable Computing System), as described in, e.g., G. Tanase et al., "Composable, non-Blocking Collective Operations on Power7 IH", ICS'12, Jun. 25-29, 2012. As the HPC systems evolve, it is imperative for the network hardware to support multiple collective operations at the same time, e.g., with low latency for short collectives and high bandwidth for long collectives, and to generate reproducible results for floating point reductions.

BRIEF SUMMARY

This section is intended to include examples and is not intended to be limiting.

An apparatus includes a collective switch hardware architecture. The collective switch hardware architecture comprises an input arrangement circuit comprising a plurality of input ports and plurality of outputs, the input arrangement circuit configured to route its plurality of input ports to a selected plurality of its outputs. The collective switch hardware architecture further comprises collective reduction logic coupled to the plurality of outputs of the input arrangement circuit and comprising a plurality of outputs. The collective reduction logic comprises one or more arithmetic logic units (ALUs) and arbitration and control circuitry. The one or more ALUs and arbitration and control circuitry are configured to support multiple simultaneous collective operations from different collective classes, and the one or more ALUs and arbitration and control circuitry are configured to support arbitrary input port and output port mapping to different collective classes. The collective switch hardware architecture further comprises an output arrangement circuit comprising a plurality of inputs coupled to the plurality of outputs of the collective reduction logic and comprising a plurality of output ports, the output arrangement circuit configured to route its plurality of inputs to a selected plurality of its output ports.

The apparatus may comprise a network switch comprising the collective switch hardware architecture. The may also comprise a router comprising the collective switch hardware architecture.

BRIEF DESCRIPTION OF THE DRAWINGS

In the attached Drawing Figures:

FIGS. 2 to 7 show high level logic block diagrams of a new collective switch hardware architecture in certain exemplary embodiments, in which:

FIG. 2 shows one possible configuration of a collective switch hardware architecture in an exemplary embodiment;

FIG. 3 shows a collective reduction logic path portion of a collective switch hardware architecture in an exemplary embodiment;

FIG. 4 shows a collective broadcast logic portion of a collective switch hardware architecture in an exemplary embodiment;

FIG. 5 shows one possible set of internals of a collective reduction logic from the collective reduction logic path of FIG. 3 in an exemplary embodiment;

FIG. 6 illustrates an example setup of three simultaneous collective operations using the collective reduction logic of FIG. 5 in an exemplary embodiment;

FIG. 7 shows an implementation of collective reduction logic with 16 input ports in an exemplary embodiment.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, as the HPC systems evolve, it is imperative for the network hardware to support multiple collective operations at the same time, with low latency for short collectives and high bandwidth for long collectives, and to generate reproducible results for floating point reductions. The description below details examples of such an invention, e.g., inside a network switch/router. It is also noted that for the example implementations, the logic works for any number of bytes, and one does not have to distinguish short and long. Furthermore, because the collective logic is placed in network switches, this allows each collective operation to be performed in one pass through the network to minimize latency. The collective logic may also allow multiple collective operations from different compute partitions to proceed in parallel, which provides high bandwidth for multiple simultaneous long collectives. Additionally, the way the collective logic is implemented will preserve binary reproducibility, i.e., providing the same result for the same inputs.

The exemplary embodiments are illustrated with the fat tree network in a Clos network topology. The Clos network is a multistage network, typically having three stages: the ingress and egress stage to which host computers are attached, middle stage, and the root stage. Packets flow up from a source at the ingress stage to the highest stage from which the destination can be reached; all destinations can be reached from the root stage. Packets then flow down the network to the destination, exiting the network at the first, egress, stage. The examples herein can be easily applied to other network topologies.

Figure 1A:
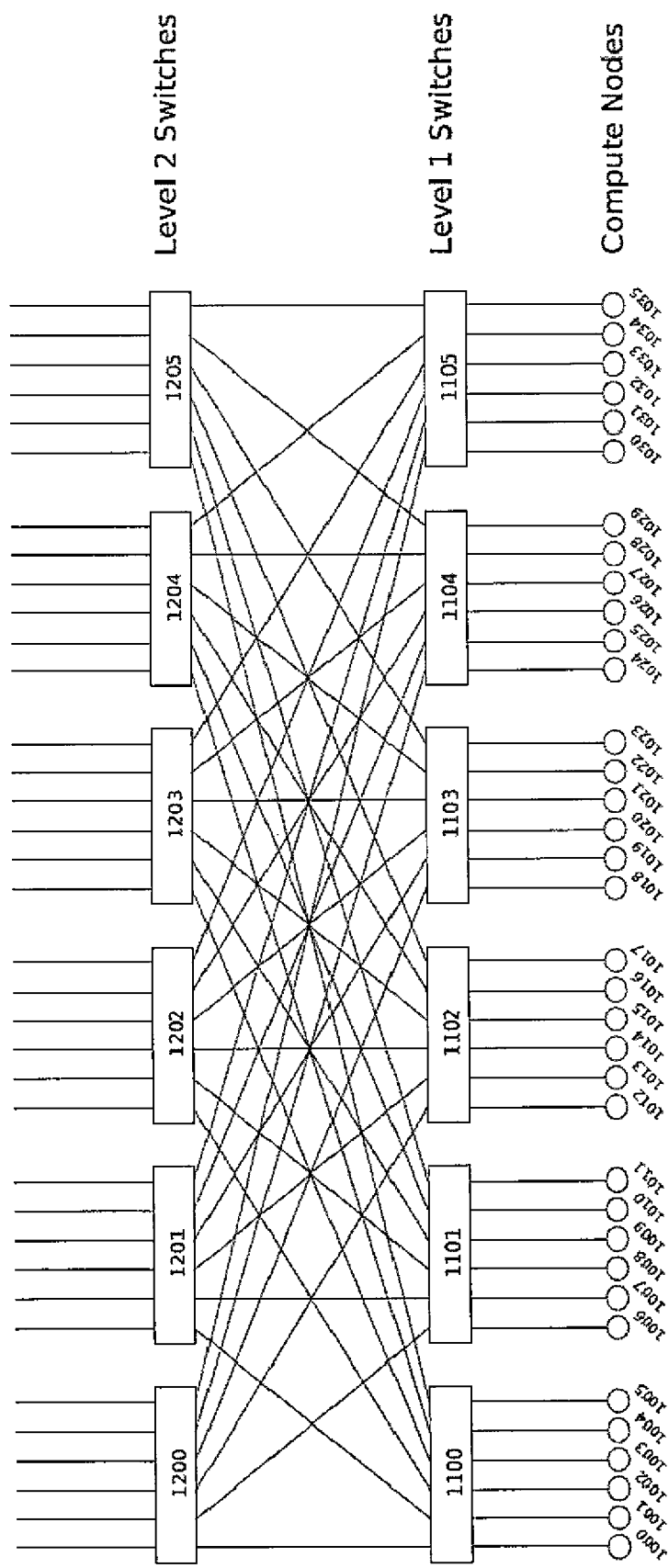
FIG. 1A shows part of a typical fat tree network.

FIG. 1A shows part of a typical fat tree network. Compute nodes 1000, 1001, . . . , 1035 are each connected to a network port of the level 1 switches 1100, 1101, 1105. Level 1 switches are then cross connected to level 2 switches 1200, 1201, . . . , 1205. Level 2 switches have additional ports from each switch to connect to higher level switches (not shown). Compute nodes can belong to different groups participating in different collective operations. The different groups can be, e.g., different compute partitions or different MPI communicators within the same partition.

Figure 1B:
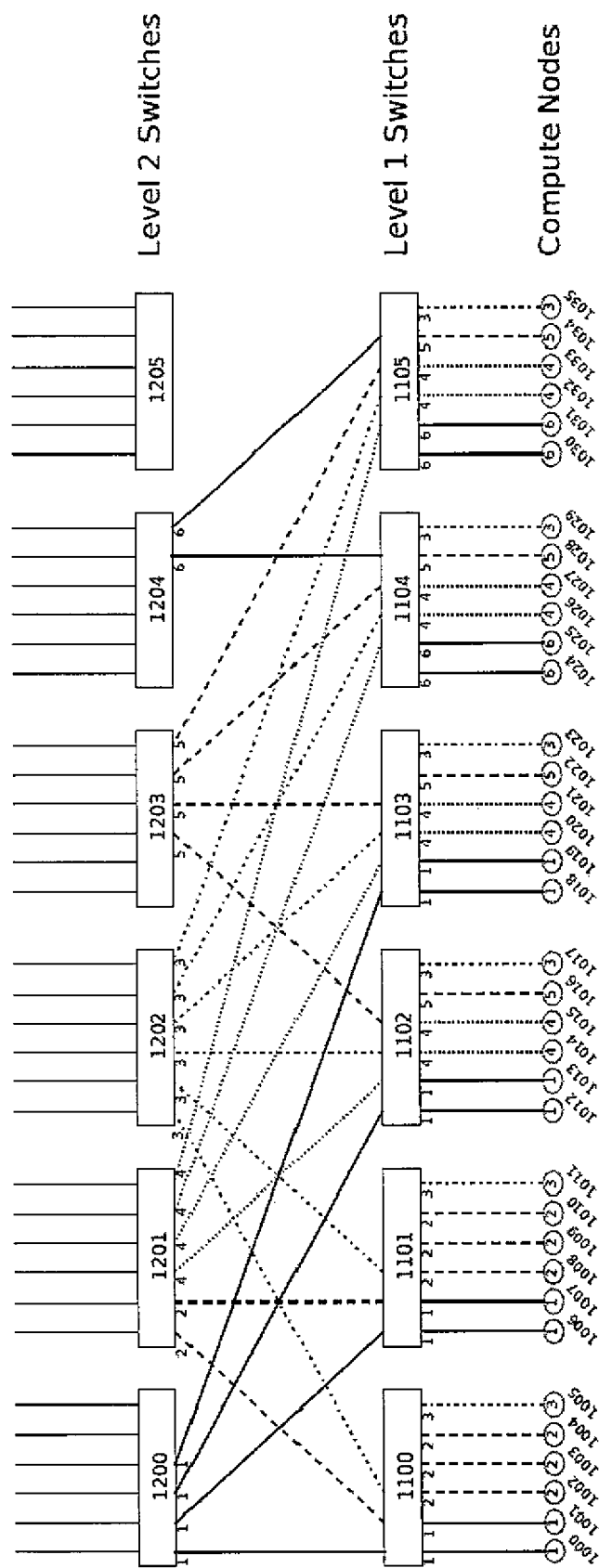
FIG. 1B shows an example of collective grouping.

FIG. 1B shows an example of collective grouping. A collective group 1 is formed by the following: compute nodes 1000 and 1001 connected to level 1 switch 1100; compute nodes 1006 and 1007 connected to level 1 switch 1101; compute nodes 1012 and 1013 connected to level 1 switch 1102; and compute nodes 1018 and 1019 connected to level 1 switch 1103. Five other collective groups 2-6 are shown. The reduction operation can be performed in hardware in the level 2 switch 1200. For example, to perform an MPI sum, each compute node 1000, 1001, 1006, 1007, 1012, 1013, 1018 and 1019 would send a vector of numbers to their connected level 1 switches. These numbers are placed in one or more network packets. The network packet specifies, among other things, the collective group ID, the collective operation to be performed, e.g., a sum, the operand word length, e.g., 4 or 8 bytes, and the number of operands in the packet. Each level 1 switch will perform a partial sum on the inputs from its compute node, i.e., level 1 switch 1100 will obtain a partial sum using inputs from 1000 and 1001, etc. In an embodiment, the partial sums on a group can begin once there is a collective packet (or suitable portion of a packet) on every input specified in the group. In an alternative embodiment, it may be possible to begin some of the partial sums early, once a suitable subset of the input packets has arrived at the switch. The partial sums are then sent from level 1 switches 1100, 1101, 1102, 1103 to the level 2 switch 1200, where the final sum is obtained. Since 1200 is the root of the collective group or class, the final sum result will be turned around inside switch 1200 and broadcasted back down to each compute node, following the reverse path from the sum operation.

In FIG. 1B, six collective groups (also called classes) are illustrated, and are numbered 1 to 6, as previously described. Level 2 switch 1201 has two collective groups 2 and 4; level 2 switch 1202 has two collective groups 2 and 4; level 2 switch 1202 has one collective group 3; level 2 switch 1203 has one collective group 5; and level 2 switch 1204 has one collective group 6.

The exemplary embodiments herein concern the collective switch hardware architecture that allows switches to perform multiple collective reductions (e.g., and also broadcasts if desired) simultaneously on non-overlapping collective groups. Here non-overlapping means that each host is in one collective group and that a network link is used by only one collective group (at the time of the reductions). A given host may use different collective groups at different times. A goal of this architecture is to support each reduction at full link bandwidth, with minimal gaps between packets between consecutive packets utilizing the same link.

Figure 2:
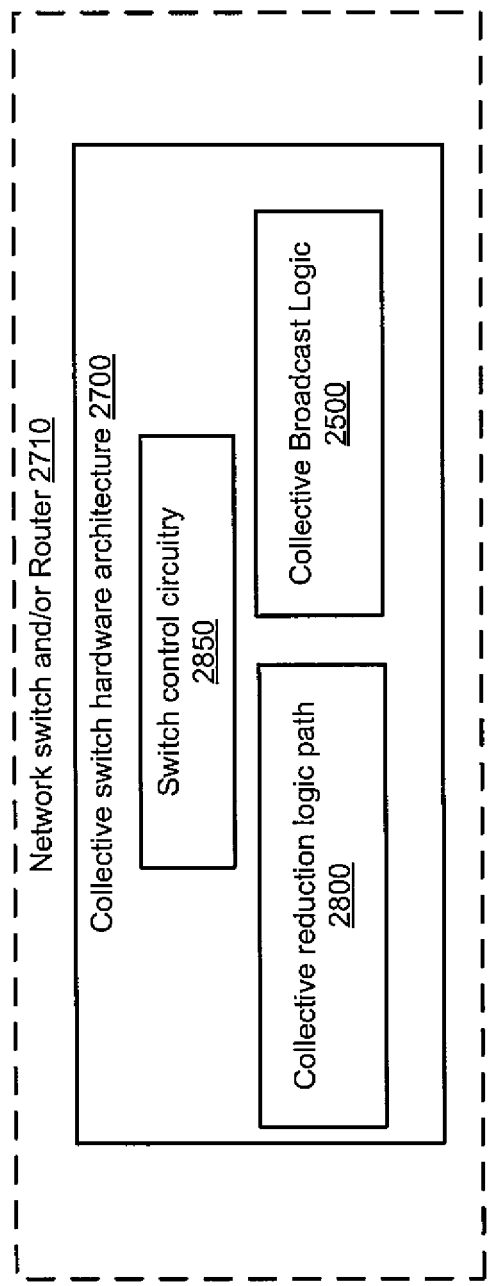
Figure 3:
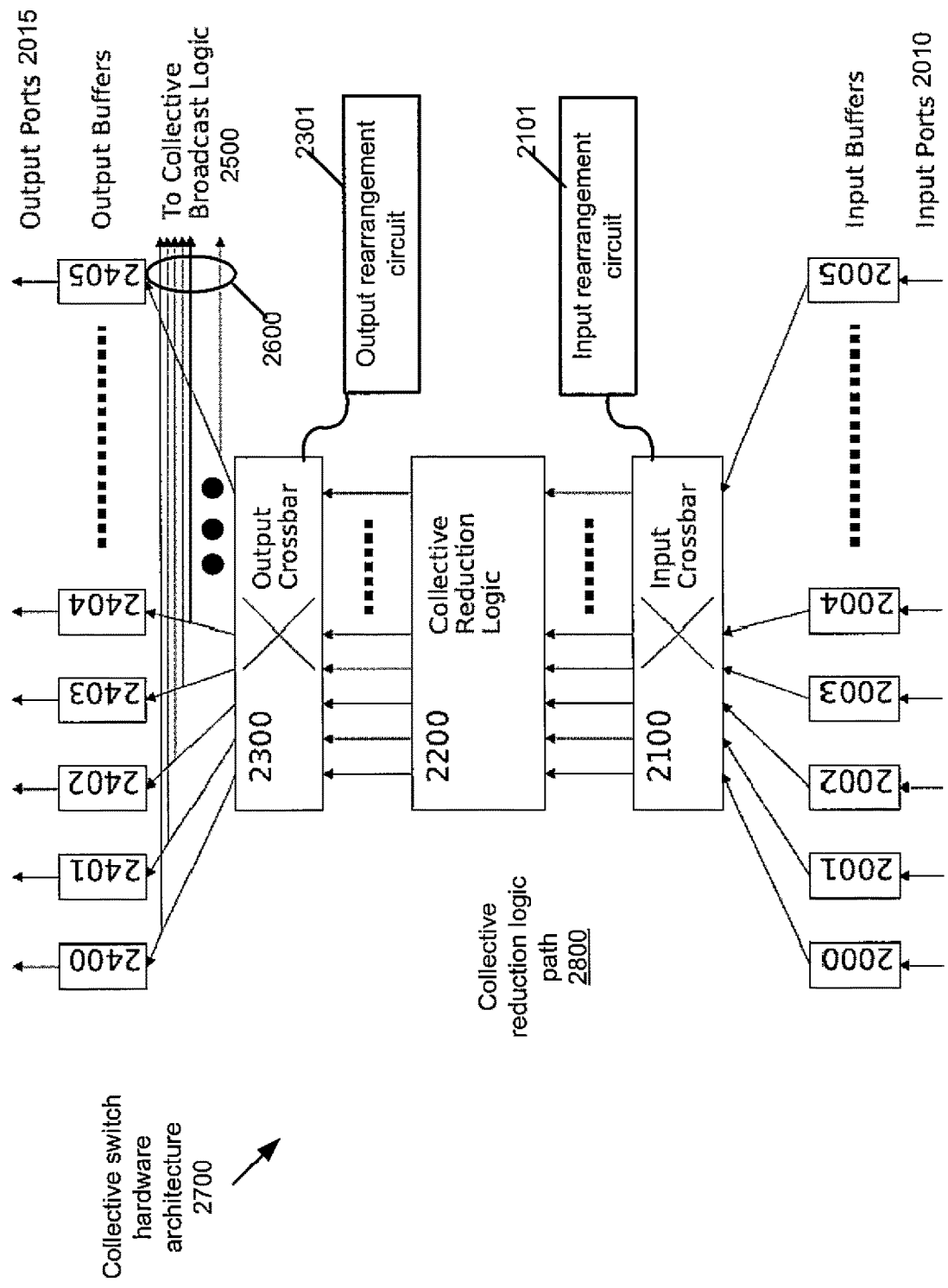
Figure 4:
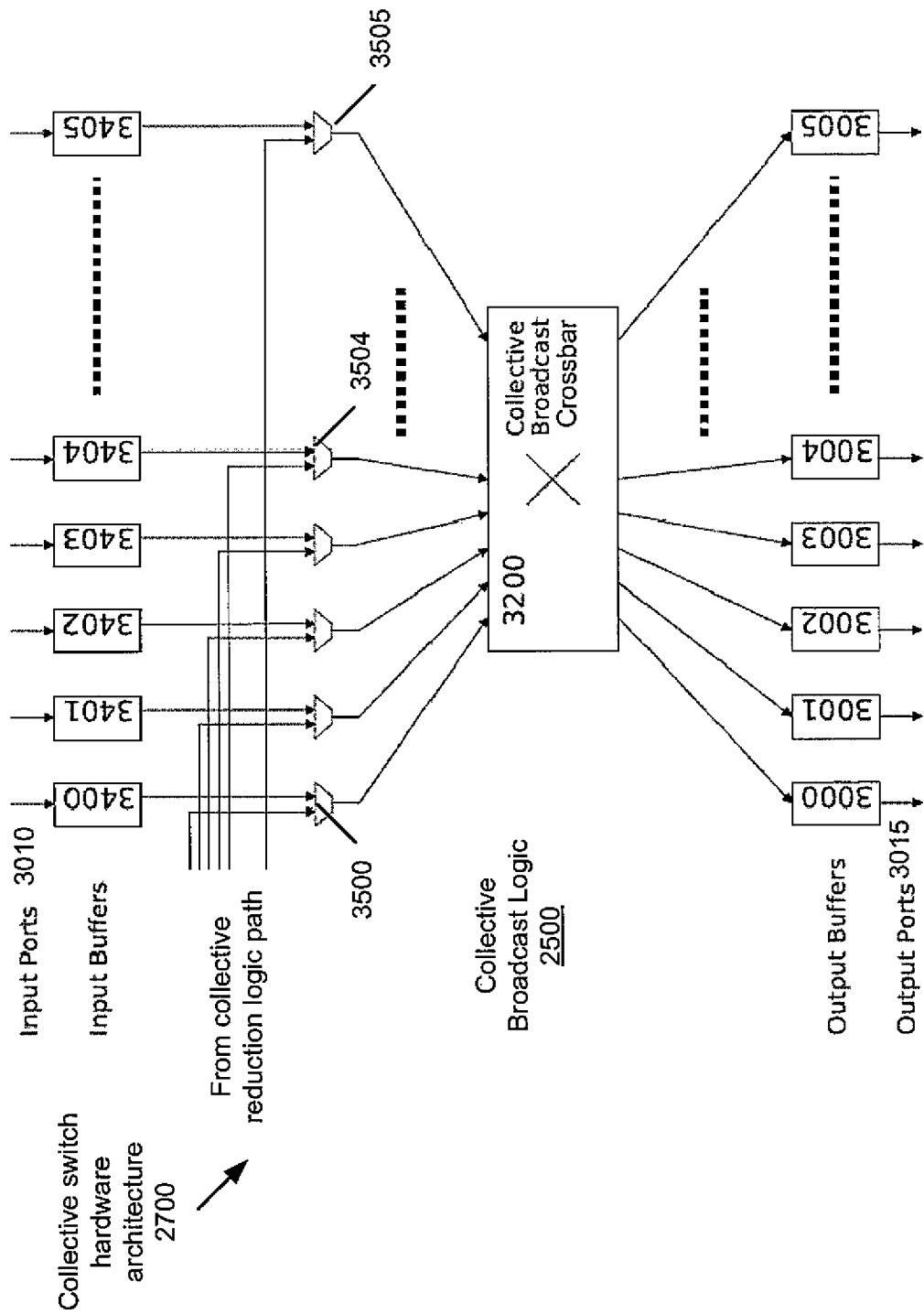

FIGS. 2 to 7 show high level logic block diagrams of this new collective switch hardware architecture. FIG. 2 shows one possible configuration of a collective switch hardware architecture 2700 in an exemplary embodiment. The network switch hardware architecture 2700 may form part of a network switch, router, or combination network switch/router 2710. The collective switch hardware architecture 2700 comprises switch control circuitry 2580, a collective reduction logic path 2800, and collective broadcast logic 2500. The collective reduction logic path 2800 and portions of this are illustrated in FIGS. 3, 5, 6, and 7, and the collective broadcast logic 2500 is illustrated in FIG. 4. The switch control circuitry 2580 may comprise a set of programmable control registers. These registers can be written using the existing switch control mechanism, either processor/memory in the switch or some other means to read/write these registers from a control host. The switch control circuitry 2580 also comprises circuitry to cause the collective switch hardware architecture 2700 (and the device 2710) to perform specific functions in response to the values in the programmed control registers.

In FIG. 3, the collective reduction logic path 2800 portion of the collective switch hardware architecture 2700 is shown. The input ports 2010 and output ports 2015 are connected to either compute nodes or other switches. The input and output ports described herein have I/O cells and associated I/O logic for both send and receive, as is known. Blocks 2000, 2001, . . . , 2005 represents input buffers associated with each physical switch port (illustrated as input ports 2010). In an embodiment, these input buffers are dedicated as collective network virtual channels in which collective network packets are stored. In an alternate embodiment, the buffers can store collective network packets that are sent on any network virtual channel, although in this embodiment additional flow control on the buffers is required to prevent buffer overflows and deadlocks, as was done in the IBM P7IH system. The buffers can be further divided into sections to support different collective classes which can perform independent collective operations at different times (in a time sequence), with appropriate flow control on the sections. For example, if there is queue in the buffer for each possible collective group, then each queue (group) can be allocated at least one (full packet-sized) buffer slot (or token) for its exclusive use, and there can also be a number of tokens to be used by any group. Let the number of input buffers be n, the input buffers feed an n×n input crossbar 2100.

The n×n (i.e., n by n) input crossbar 2100 reorders the input ports 2010 so that ports 2010 belonging to the same collective class are grouped together. A collective class is a group (or collection) of compute nodes (or compute processes) that participates in the same collective operation. For example, in a parallel job running MPI, typically there is a collective class associated with all compute nodes for this job (called MPI_COMM_WORLD). There can also be sub-collective classes that a subset of compute nodes participates in. The output from the n×n input crossbar 2100 is connected to the collective reduction logic block 2200. The outputs from the collective reduction logic block 2200 connect to an n×n output crossbar 2300. The outputs from the n×n output crossbar 2300 connect to output buffers 2400, 2401, 2402, 2403, 2404, . . . , 2405 on each physical switch port (illustrated as output ports 2015). For an intermediate switch chip, level 1 or level 2 in FIG. 1A, the output ports 2015 go to the switch ports on top of each switch. For a top level switch, e.g., a level 3 switch not drawn in a 3 level FAT tree topology, the output ports 2015 of the collective logic do not connect to physical switch ports, and are only connected to the inputs of the down-tree broadcast logic. The n×n output crossbar 2300 outputs 2600 also connect directly into the down tree collective broadcast logic 2500 (see FIG. 4) inside the same switch, which is used when the switch is the root of a collective class map. In other words, if the switch generates the final result of a collective reduction operation, then the switch is the root switch for that collective class, and there would there be no outputs on the output ports 2015 and the results would instead only be reflected back (via the collective broadcast logic 2500).

It should be noted that the input crossbar 2100 is a specific example of an input rearrangement circuit 2101, which can take any input and route such input to any order of output(s). The output crossbar 2300 is similarly a specific example of an output rearrangement circuit 2301, which can take any input and route such input to any order of output(s). A crossbar is one implementation of such a circuit. CLOS networks can accomplish the same functions, with more but simpler components. Furthermore, if the definition of the collective groups is restricted so that the groups use only adjacent, or nearly adjacent links, the rearrangement circuit can be simplified to support only the required collective groups. This might be the case in more specialized machines, such as a machine learning "appliance". For example, suppose each collective group is restricted to be within a set of m adjacent inputs for some integer m>=1, then the rearrangement circuit may consist of k sets of m×m crossbars where k=ceiling(n/m). If the groups are guaranteed to be always on consecutive input links, the rearrangement circuit may just pass the data from the input buffer to the appropriate input in the reduction logic's ALUs. The output crossbar is also a specific example of an output rearrangement circuit, and similar optimizations apply there as well.

FIG. 4 shows the collective broadcast logic 2500 portion of the collective switch hardware architecture 2700. Switch input ports 3010 feed input buffers 3400, 3401, 3405. For each input buffer 3400 to 3405, a corresponding 2 to 1 mux (multiplexor) 3500 to 3505 selects data either from the input port 3010/input buffer or the output from collective reduction logic path 2800 (for turn-around broadcast at the root of the collective class). The results are then fed into an n×n collective broadcast cross-bar 3200. This is a cross-bar where multiple outputs can be enabled at the same time for a specific input, to allow one-to-many broadcast operation in the same switch. As discussed earlier, the crossbar is a preferred embodiment, but any appropriate rearrangement circuit that permits each input to reach all of its necessary outputs simultaneously may be used. The outputs from the collective broadcast logic are then connected to output buffers 3000, 3001, . . . , 3005 and therefore to corresponding output ports 3015. The output ports 3015 are connected to switches lower in the chain, or to compute nodes. In an embodiment, when a packet arrives at a switch to be broadcast, the logic starts reserving the appropriate links for the broadcast as they free up. When all links are free and have been reserved, the broadcast can proceed. Other embodiments are possible in which the packet is broadcast on a subset of free links, and then re-sent or re-broadcast as more links free up. If the switch supports output buffering, similar ideas apply as long as there is space in the output buffers.

Figure 5:
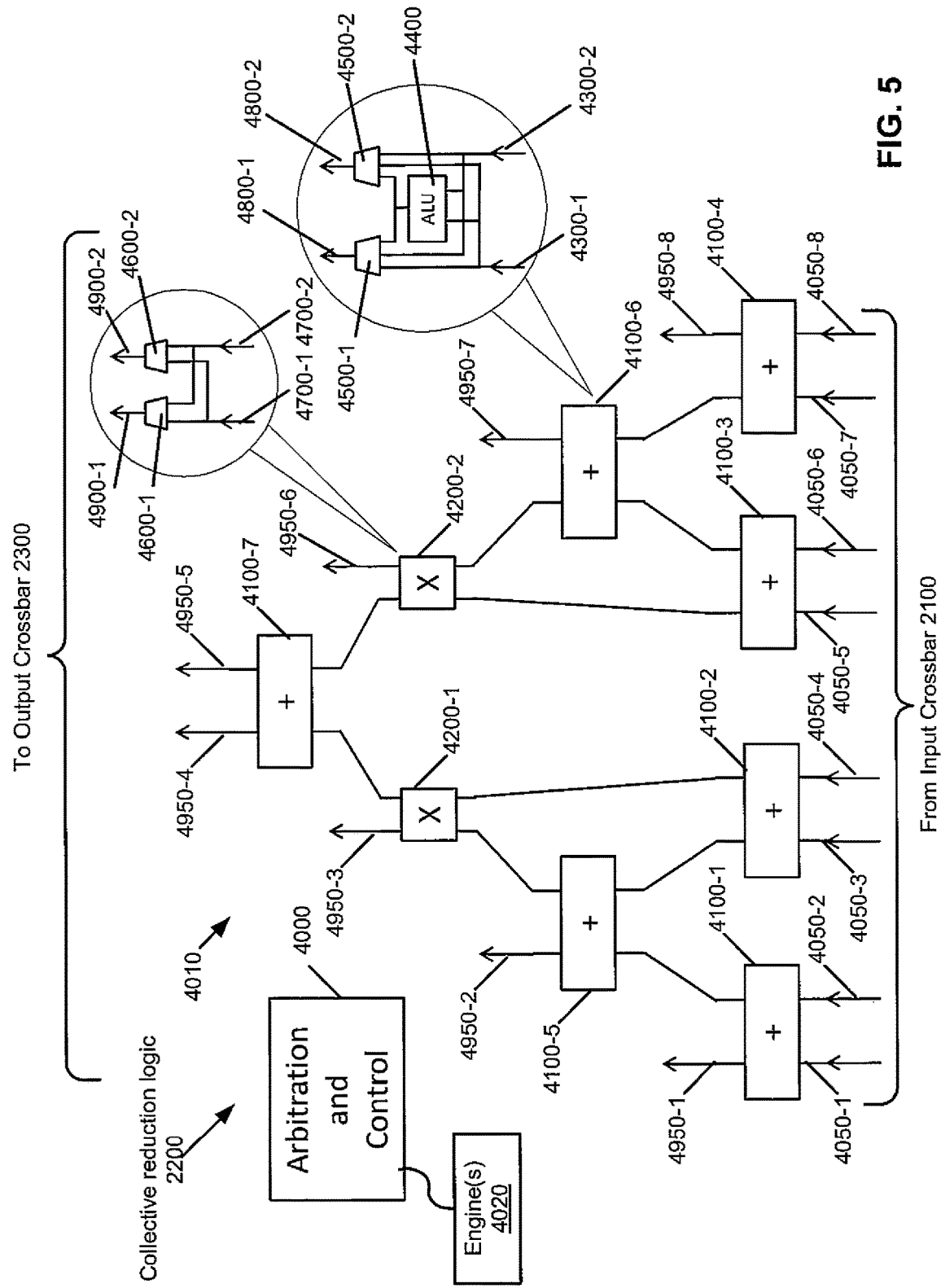

FIG. 5 shows one possible set of internals of collective reduction logic block 2200 from the collective reduction logic path 2800 of FIG. 3. An eight-input collective reduction circuit (e.g., a block) 4010 is illustrated in FIG. 5. The 8 output ports 4950-1 through 4950-8 are there for routing flexibility. If all eight inputs 4050 belong to a single collective reduction class, then there is only one output port 4950 active, which has the result of the 8-way reduction. If there are multiple collective reduction classes, then more than one output port 4950 will be active. The eight-input collective reduction circuit 4010 is a single logarithmic ALU tree and comprises seven two-way reduction blocks 4100-1 through 4100-7 and two 2×2 crossbars 4200-1 and 4200-2. In particular, the reduction blocks 4100 (with a "+" sign), the number of them are 4, 2, 1 in each level, for a total of $\log_2(N)$ levels, assuming N is the number of inputs. Thus, this tree is considered to be logarithmic. However, this is only exemplary and there does not need to be such a logarithmic design. Furthermore, although inputs and outputs are also typically functions of two (e.g., 8, 16, 32, . . . ), the inputs and outputs are not limited to such and other numbers of inputs and outputs such as 6 or 12 possibly odd numbers may be used. The reduction blocks 4100 are the most logic intensive because these perform integer and floating point additions. The mux blocks are for flexibility but do not use much logic area. The most natural way to implement the blocks 4100 is to make a two way input. One can certainly make blocks 4100 that have 3-way or 4-way inputs, although these might not be as efficient logic wise. Note, two two-ways (e.g., 4100-1 and 4100-2) at the lower level and one two-way (e.g., 4100-5) at the top is effectively a four-way input. For sake of clarity, only some of the inputs and outputs from the various circuit blocks are marked with reference numerals on this figure.

Each two-way reduction block 4100-1 through 4100-7 (illustrated with a "+") has two inputs and two outputs. The two-way reduction block 4100-1 has inputs 4050-1 and -2; block 4100-2 has inputs 4050-3 and -4; block 4100-3 has inputs 4050-5 and -6; and block 4100-4 has inputs 4050-7 and -8. The two-way reduction block 4100-6 has an exemplary internal structure shown (and the other reduction blocks 4100 are expected to be the same or similar) and has inputs 4300-1 and 4300-2 and outputs 4800-1 and 4800-1. There is an internal arithmetic logic unit (ALU) 4400 that can perform combining operations taking operands from both inputs. The combining operation, operand word length, and collective group ID are specified in the network packets. The combining operations include but are not limited to the following: logic AND, OR, XOR; integer SUM, MIN, MAX, MINLOC, MAXLOC; floating point SUM, MIN, MAX, MINLOC, MAXLOC; and the like, as well as the word size such as 4-byte or 8-byte integers and half precision (16 bit), single precision (32 bit) or double precision (64 bit) floating point numbers. Any size integer number up to the maximum packet size can be supported. Typically, the same combining operation is applied to all the data in the same packet, but it is also possible to have multiple combining operations specified and applied to different parts of the packet. The MINLOC operation typically returns a minimum value and a location (e.g., MPI rank) having that value; the location is typically stored next to the floating point number in the packet. Similarly, the MAXLOC operation typically returns a maximum value and a location having that value. Design of ALUs for these and other functions is well known. Each output port 4800 can select (via a corresponding one of the muxes, multiplexors, 4800-1 or 4800-2) data from one input port 4300 or the result from the ALU. The logic may also include error checking, such as ensuring all inputs specify the same combining operation.

In additional to the two-way reduction blocks 4100, two 2×2 crossbars 4200-1 and 4200-2 are included in this example to add flexibility in data routing. The two 2×2 crossbars 4200 comprise two muxes 4600-1 and 4600-2, which can select one of the inputs 4700-1 or 4700-2 as a corresponding output 4900-1 or 4900-2. All collective class configurations are performed by programming the arbitration and control circuitry 4000, which controls the reduction blocks 4100 and fluxes 4200. The circuitry 4000 also handles arbitration for collective operations and may contain multiple arbitration engines 4020 to enable simultaneous collective operations. Each engine 4020 typically is handling one combining operation at a time. For example, from input port requests, setting muxes and ALUs, giving grants to input ports, waiting until the collective operation is done (usually for a network packet/input port), then waiting for the next operation can be controlled by an engine. It is easier for one engine to track one collective operation. Multiple engines 4020 may be used to keep track of different collective operation that can happen simultaneously. Typically, the arbitration and control circuitry 4000 (and its engines 4020) would be specially designed logic comprising, e.g., state machines and control circuits. There will be some programmability in order to configure an operation. In general, the collective operations are not controlled by a processor/memory as this will be too slow.

A typical data control and flow is as follows. (1) The global partitioning is done by the control software at or prior to job launch time, and this presets the input/output crossbars, i.e., it groups all inputs that belong to a job together. There can be multiple jobs (associated with different switch I/O ports) running at the same time and different collective operations can happen simultaneously for different jobs. (2) Within a group of inputs belonging to the same job, there can be multiple classes of collective operations happening at the same time also. (3) For each class of collective operations within the same job, a set of input ports is defined, e.g., in a table that can be read by (e.g., or implemented within) the arbitration and control circuitry 4000. Each input port will send a request to the arbitration and control circuitry 4000 when the port receives collective network packets. When all input ports associated with a particular collective operation raise their requests, the arbitration and control circuitry 4000 knows that a particular collective operation can proceed. The arbitration and control circuitry 4000 sets the corresponding muxes 4500 as well as ALUs 4400 for this operation, and gives grants back to each input buffer. Each input port then sends its corresponding data to the ALU. The final result will go to one of the output ports.

Figure 6:
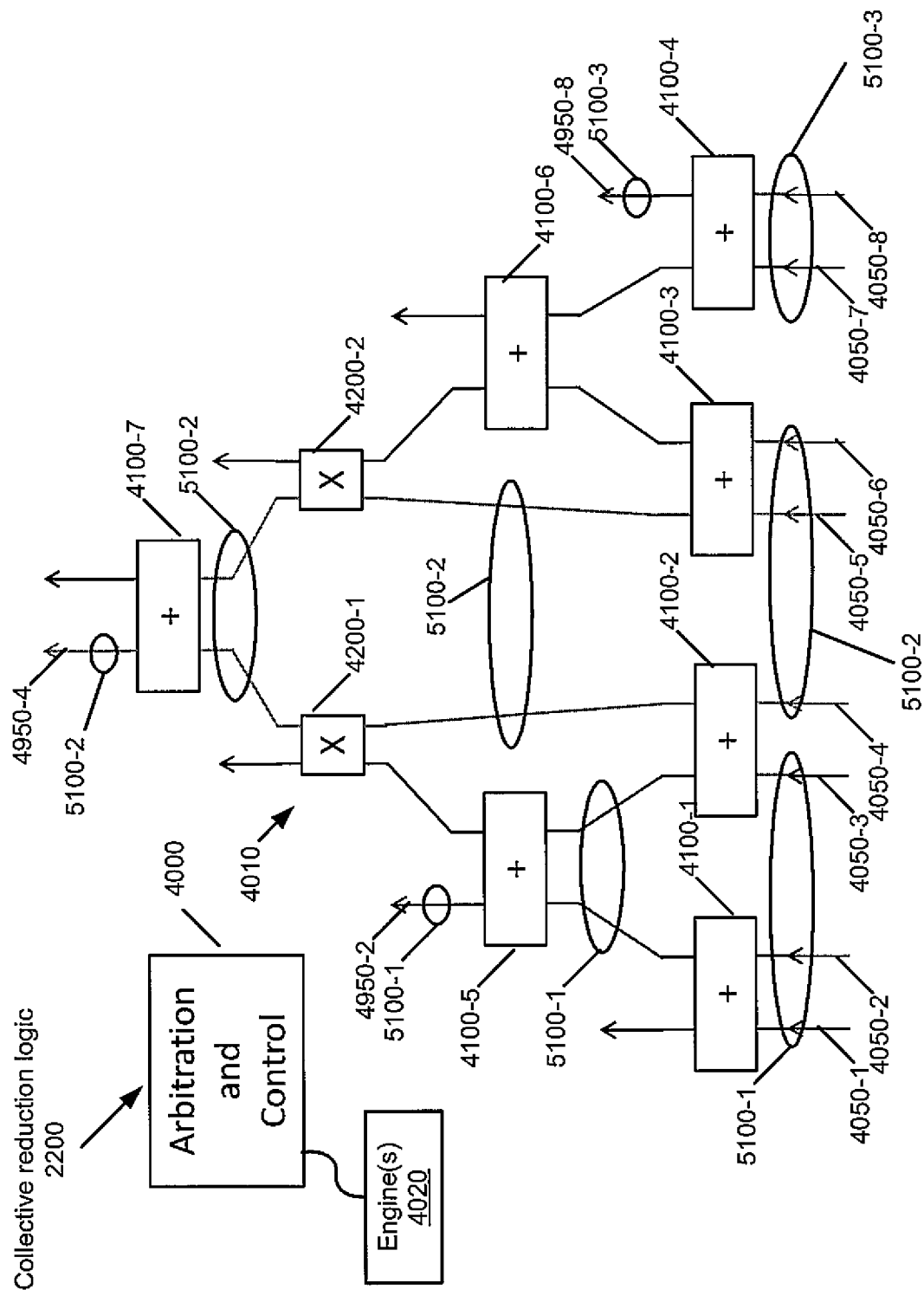

FIG. 6 illustrates an example setup of three simultaneous collective operations, with three, three, and two input ports each, using the collective reduction logic 2200 of FIG. 5. The three collective classes have inputs as follows: collective class 1 has inputs of 4050-1, 4050-2, and 4050-3; collective class 2 has inputs of 4050-4, 4050-5, and 4050-6; and collective class 3 has inputs of 4050-7, 4050-8, and 4050-3. The flows through the collective reduction logic 2200 are indicated by reference numbers 5100 and are as follows: the flow for collective class 1 is indicated by reference number 5100-1 and flows through the two-way reduction blocks 4100-1, 4100-2 and 4100-5, and ends at output 4950-2; the flow for collective class 2 is indicated by reference number 5100-2 and flows through the two-way reduction blocks 4100-2, 4100-3 and 4100-7 and 2×2 crossbars 4200-1 and 4200-2, and ends at output 4950-4; the flow for collective class 3 is indicated by reference number 5100-3 and flows through the two-way reduction block 4100-4, and ends at output 4950-8. With proper setup (e.g., of the arbitration and control circuitry 4000), there is no conflict in logic data paths and all three collective operations can proceed at the same time (e.g., in parallel). It is noted that the "unused" output ports 4950 are just unused for a particular collective operation. They may get used when a next set of collectives come in with a different collective class map.

Figure 7:
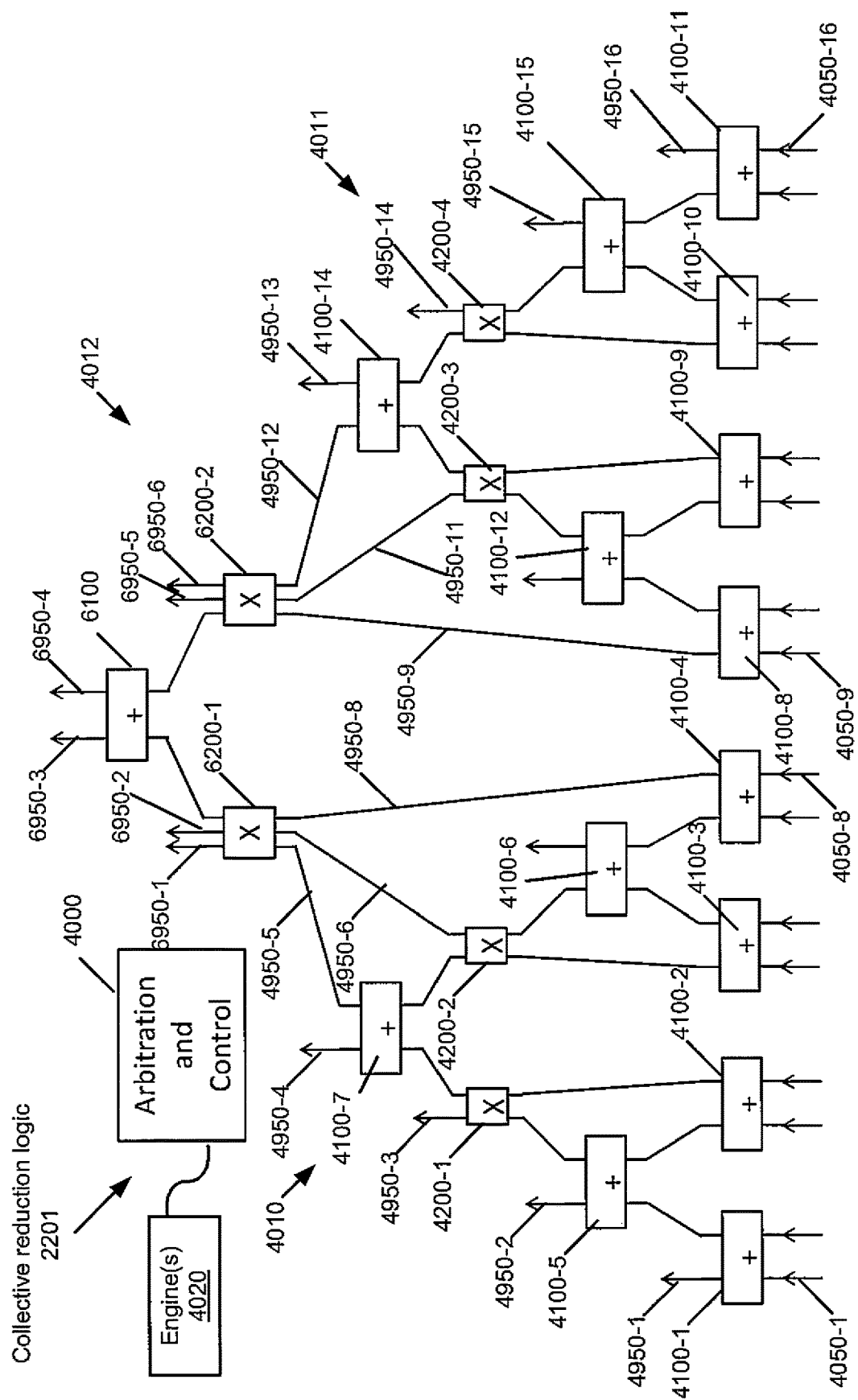

The concept of the logic structure can be extended to more input ports. FIG. 7 shows an exemplary implementation of a collection reduction logic 2201 with 16 input ports 4050-1 through 4050-16. The collection reduction logic 2201 comprises a 16-input collection reduction circuit 4012 that is a single logarithmic ALU tree and that comprises two eight-input collection reduction circuits 4010 and 4011. The eight-input collection reduction circuit 4011 comprises input ports 4050-9 through 4040-16, outputs 4950-9 through 4950-16, seven two-way reduction blocks 4100-8 through 4100-14 and two 2×2 crossbars 4200-3 and 4200-4. The 16-input collection reduction circuit 4012 additionally comprises two 3×3 crossbars 6200-1 and 6200-2, each of which would have another mux 4600 for a total of three muxes 4600-1 through 4600-3, each of which could select one of the inputs as an output of the mux. The muxes 4600 are not shown in FIG. 7. Additionally, for sake of clarity, only some of the inputs and outputs from the various circuit blocks are marked on this figure.

The outputs 4950-5, 4950-6 and 4950-8 feed the 3×3 crossbar 6200-1, and the outputs 4950-9, 4950-11, and 4950-12 feed the 3×3 crossbar 6200-2. The 16-input collection reduction circuit 4012 further comprises another two-way reduction block 6100. The outputs of the 16-input collection reduction circuit 4012 are outputs 4950-1 through 4950-4, 6950-1 through 6950-6, and 4950-13 through 4950-16.

Figure 8A:
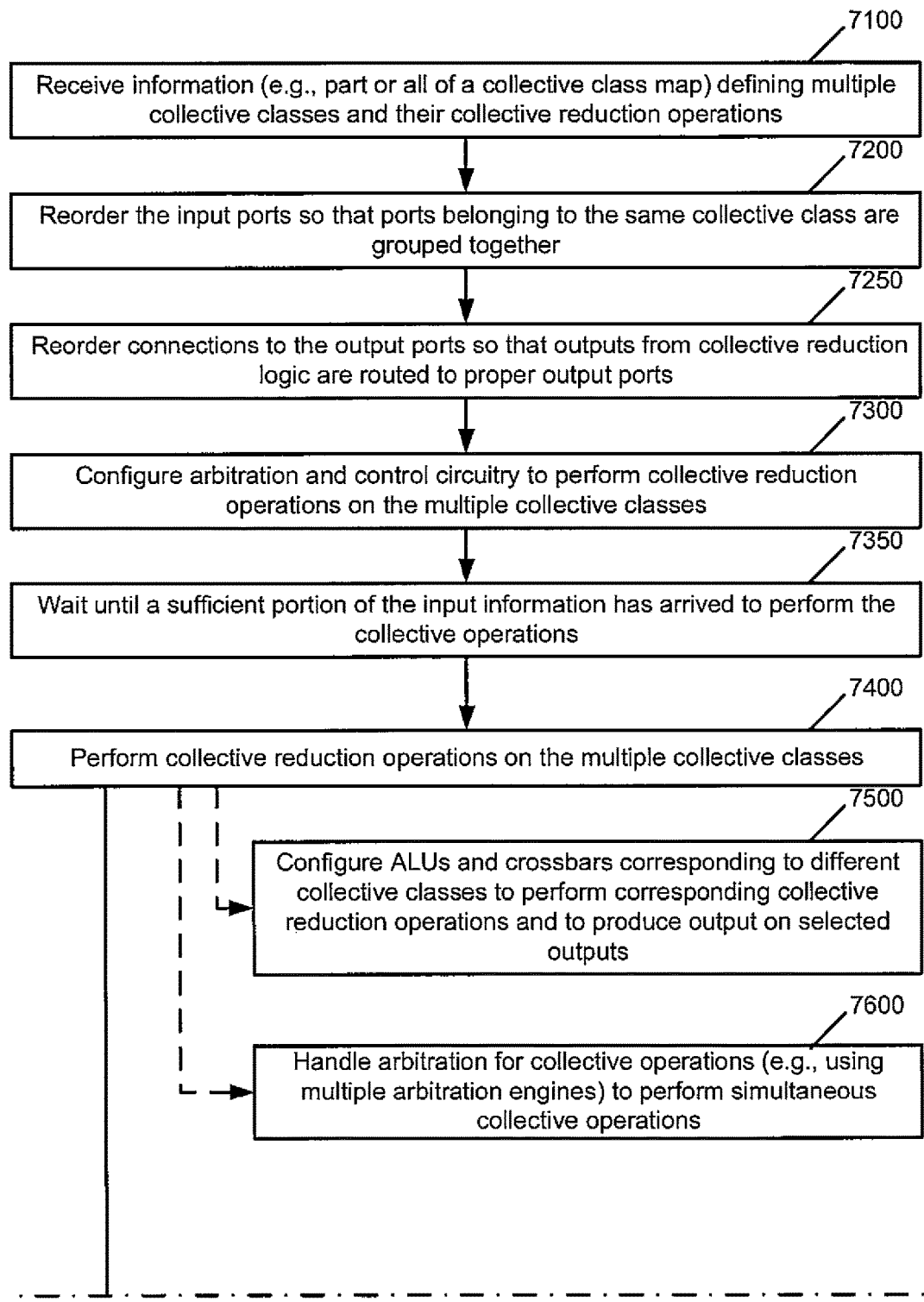
FIGS. 8A and 8B, is a logic flow diagram for the collective switch hardware architecture to support multiple simultaneous collective operations, and illustrates the operation of an exemplary method, a result of execution of computer program instructions embodied on a computer readable memory, functions performed by logic implemented in hardware, and/or interconnected means for performing functions in accordance with exemplary embodiments.
Figures 8, 8B:
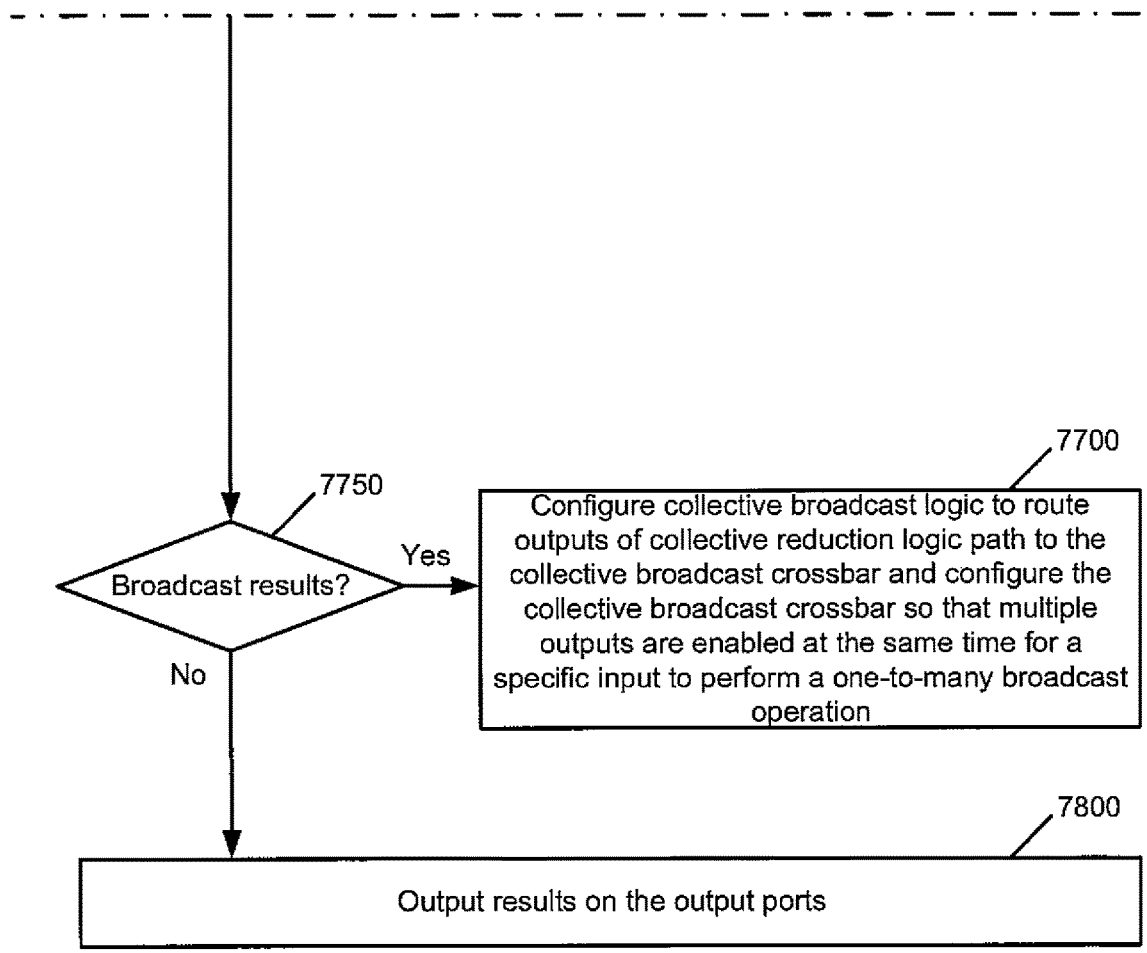
FIG. 8, which is divided into

Turning to FIG. 8, which is divided into FIGS. 8A and 8B, this figure is a logic flow diagram for the collective switch hardware architecture 2700 to support multiple simultaneous collective operations. This figure illustrates the operation of an exemplary method, a result of execution of computer program instructions embodied on a computer readable memory, functions performed by logic implemented in hardware, and/or interconnected means for performing functions in accordance with exemplary embodiments.

In block 7100, the collective switch hardware architecture 2700 receives information (e.g., part or all of a collective class map) defining multiple collective classes and their collective reduction operations. This information (or some part thereof) may also be received by the switch control circuitry 2850. Typically, the class maps are preloaded onto the switches either at job launch time or during job execution if the job wants to use specific class maps that are not pre-defined by the system. The network data packets in the input buffers contain the specific class map id to use as well as the ALU operation to perform. In block 7200, the input crossbar 2100 (e.g., after configuration by the switch control circuitry 2850) reorders the input ports so that ports belonging to the same collective class are grouped together. In block 7250, the output crossbar (e.g., under instruction by the switch control circuitry 2580) reorders the connections to the output ports so that outputs from collective reduction logic are routed to proper output ports. In block 7300, the switch control circuitry 2850 configures the arbitration and control circuitry 4000 to perform collective reduction operations on the multiple collective classes.

After configuration is performed, the collective switch hardware architecture 2700 has to wait until enough input information is received. This occurs in block 7350, where the collective switch hardware architecture 2700 waits until a sufficient portion of the input information has arrived to perform the collective operations.

Once the sufficient portion of the input information has arrived, the collective operations are begun. In block 7400, the single logarithmic ALU tree (e.g., a collective reduction circuit such as a circuit 4010 or 4012) performs collective reduction operations on the multiple collective classes. The block 7400 may be performed using one or more of the blocks 7500 or 7600, as examples. In block 7500, the arbitration and control circuitry 4000 configures ALUs 4400 and crossbars (e.g., 4200, 6200) corresponding to different collective classes to perform corresponding collective reduction operations and to produce output on selected outputs. In block 7600, the arbitration and control circuitry 4000 handles arbitration for collective operations (e.g., using multiple arbitration engines) to perform simultaneous collective operations.

In block 7750, it is determined (e.g., by the arbitration and control circuitry 4000) if the results should be broadcast. If so (block 7750=Yes), in block 7700, the switch control circuitry 2580 configures the collective broadcast logic 2500 to route outputs of collective reduction logic path 2800 to the collective broadcast crossbar 3200 and configure the collective broadcast crossbar 3200 so that multiple outputs of the collective broadcast crossbar are enabled at the same time for a specific input to perform a one-to-many broadcast operation. A broadcast by default goes to all output ports that are associated with the input ports, i.e., the same physical I/O receiver/sender pair. There is a special reduce to one node operation, where the results only go to one node. In this case, one can still broadcast to all nodes and have the end node drop the results if it is not the target, or have the switch only send data to the target node. If it is determined the results should not be broadcast (block 7750=No), in block 7800, the results are output on the output ports.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus, comprising:
   collective switch hardware architecture, comprising:
   an input arrangement circuit comprising a plurality of input ports and plurality of outputs, the input arrangement circuit configured to route its plurality of input ports to a selected plurality of its outputs, wherein the input arrangement circuit is configured to reorder the input ports so that input ports belonging to individual ones of a same collective class are grouped together on adjacent outputs of the input arrangement circuit;
   collective reduction logic coupled to the plurality of outputs of the input arrangement circuit and comprising a plurality of outputs, the collective reduction logic comprising plurality of arithmetic logic units (ALUs) and arbitration and control circuitry, the plurality of ALUs and arbitration and control circuitry configured to support multiple simultaneous collective operations from different collective classes, wherein the arbitration and control circuitry of the collective reduction logic causes corresponding operations for individual collective classes to be performed by corresponding one or more of the plurality of ALUs assigned to adjacent outputs of the input arrangement circuit in a corresponding group; and
   an output arrangement circuit comprising a plurality of inputs coupled to the plurality of outputs of the collective reduction logic and comprising a plurality of output ports, the output arrangement circuit configured to route its plurality of inputs to a selected plurality of its output ports,
   wherein the input arrangement circuit, the plurality of ALUs and arbitration and control circuitry in the collective reduction logic, and the output arrangement circuit are configured to support arbitrary mapping to different collective classes, the mapping from input ports of the input arrangement circuit to output ports of the output arrangement circuit.

2. The apparatus of claim 1, wherein the selected plurality of its outputs for the input arrangement circuit is all of the plurality of outputs for the input arrangement circuit.

3. The apparatus of claim 2, wherein the input arrangement circuit comprises an input crossbar.

4. The apparatus of claim 1, wherein selected plurality of its output ports for the output arrangement circuit is all of the plurality output ports for the output arrangement circuit.

5. The apparatus of claim 4, wherein the output arrangement circuit comprises an output crossbar.

6. The apparatus of claim 1, wherein the plurality of ALUs are implemented as an ALU tree.

7. The apparatus of claim 6, wherein the ALU tree comprises a single logarithmic ALU tree.

8. The apparatus of claim 1, wherein the arbitration and control circuitry is further configured to support multiple simultaneous collective operations from different collective classes for long collective operations.

9. The apparatus of claim 1, wherein the arbitration and control circuitry is further configured to support multiple simultaneous collective operations from different collective classes for short collective operations.

10. The apparatus of claim 1, wherein the collective switch hardware architecture further comprises switch control circuitry, and wherein the switch control circuitry is configured to configure the input arrangement circuit to reorder the input ports so that input ports belonging to the same collective class are grouped together on adjacent outputs of the input arrangement circuit.

11. The apparatus of claim 1, wherein one or both of the collective reduction logic and the output arrangement circuit are configured to send output for a same collective class to a selected one or more of the output ports, wherein any of the output ports can be selected for a same collective class.

12. The apparatus of claim 11, wherein the collective switch hardware architecture further comprises switch control circuitry, and wherein the switch control circuitry configures one or both of the collective reduction logic and the output arrangement circuit to send the output for the same collective class to the selected one port.

13. The apparatus of claim 1, wherein each of the plurality of ALUs forms part of one of a plurality of reduction blocks, each reduction block comprising a corresponding ALU that performs one or more combining operations on inputs of a corresponding reduction block to create an output.

14. The apparatus of claim 13, wherein the one or more combining operations comprises one or more of the following: logic AND, OR, XOR; integer SUM, MIN, MAX, MINLOC, MAXLOC; and floating point SUM, MIN, MAX, MINLOC, MAXLOC.

15. The apparatus of claim 13, wherein at least one of the plurality of reduction blocks comprises one or more multiplexors that select one of the inputs of the inputs to the at least one reduction block or the output of the ALU of the at least one reduction block to produce an output of the at least one reduction block.

16. The apparatus of claim 15, wherein the collective reduction logic further comprises a plurality of crossbars, each crossbar having multiple inputs, each connected to a corresponding different reduction block, and having multiple outputs, each crossbar configured to route each of its inputs to one of its outputs.

17. The apparatus of claim 16, wherein the arbitration and control circuitry supports multiple simultaneous collective operations from different collective classes at least by being configured to program, for each collective class of the different collective classes, a set of combining operations in corresponding one or more of the plurality of ALUs, to program the multiplexors and the crossbars, if used, of the reduction blocks to perform a collective operation for the class and to perform routing to route a result of the collective operation to a specific one of the outputs of the plurality of ALUs.

18. The apparatus of claim 13, wherein the collective reduction logic further comprises a plurality of crossbars, each crossbar having multiple inputs, each input connected to a corresponding different reduction block, and having multiple outputs, each crossbar configured to route each of its inputs to one of its outputs.

19. The apparatus of claim 1, wherein the arbitration and control circuitry is further configured to handle arbitration for collective operations to perform simultaneous collective operations for the different collective classes.

20. The apparatus of claim 1, further comprising switch control circuitry and collective broadcast logic comprising a collective broadcast arrangement circuit, and wherein the switch control circuitry configures the collective broadcast logic to route outputs of the output arrangement circuit to the collective broadcast arrangement circuit and configure the collective broadcast arrangement circuit so that multiple outputs are enabled at the same time for a specific input to perform a one-to-many broadcast operation.

21. The apparatus of claim 20, wherein the broadcast arrangement circuit comprises a broadcast crossbar.

22. The apparatus of claim 20, wherein the collective broadcast logic further comprises a plurality of multiplexors, each multiplexor having two inputs coupled to an output of the output arrangement circuit and to input port and configured to select one of the inputs as an output, and the switch control circuitry configures the collective broadcast logic to route outputs of the output arrangement circuit to the collective broadcast arrangement circuit by configuring the plurality of multiplexors.

23. The apparatus of claim 1, wherein the apparatus comprises a network switch comprising the collective switch hardware architecture.

24. The apparatus of claim 1, wherein the apparatus comprises a router comprising the collective switch hardware architecture.

* * * * *